US 6,732,298 B1

(12) United States Patent
Murthy et al.

(10) Patent No.: US 6,732,298 B1
(45) Date of Patent: May 4, 2004

(54) NONMASKABLE INTERRUPT WORKAROUND FOR A SINGLE EXCEPTION INTERRUPT HANDLER PROCESSOR

(75) Inventors: Purna C. Murthy, Houston, TX (US); Michael L. Sabotta, Cypress, TX (US); Thomas W. Grieff, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 538 days.

(21) Appl. No.: 09/628,747

(22) Filed: Jul. 31, 2000

(51) Int. Cl.$^7$ .................................................. H02H 3/05
(52) U.S. Cl. ........................................ 714/34; 710/262
(58) Field of Search ....................... 714/34, 35; 710/48, 710/260, 261, 262, 263, 264, 266

(56) References Cited

U.S. PATENT DOCUMENTS

| 5,086,500 | A | * | 2/1992 | Greub ........................ 713/401 |
| 5,437,042 | A | * | 7/1995 | Culley et al. .................. 710/28 |
| 5,495,615 | A | * | 2/1996 | Nizar et al. .................. 710/260 |
| 5,513,319 | A | * | 4/1996 | Finch et al. ................... 714/55 |
| 5,555,420 | A | * | 9/1996 | Sarangdhar et al. ........ 710/266 |
| 6,272,584 | B1 | * | 8/2001 | Stancil ........................ 710/241 |
| 6,324,684 | B1 | * | 11/2001 | Matt et al. .................. 717/124 |

OTHER PUBLICATIONS

*PowerPC 750™RISC Microprocessor Technical Summary*, PowerPC, MPC750/D, Aug. 1997, 31 p.; IBM, Motorola.
*PowerPC 740™ PowerPC 750™RISCO Microprocessor User's Manual*, PowerPC, GK21–0263–00, Feb. 23, 1999, Chapter 7, pp. 7–18 through 7–24, IBM.
*PowerPC 740 and PowerPC 750 Microprocessor Datasheet*, CMOS 0.20 μm Cooper Technology, PID–8p, PPC740L and PPC750L, dd3.2, Version 1.02, Dec. 8, 1999, 47 p., IBM Microelectronics Division.

* cited by examiner

*Primary Examiner*—Dieu-Minh Le

(57) ABSTRACT

A system and method is disclosed for debugging of a hardware board that includes a processor with only a single level of interrupts that are either all enabled or all disabled. The processor does not implement nonmaskable interrupts. The processor on the board contains a machine check exception (MCP) input line that permits implementation of a nonmaskable pseudo-interrupt for debugging of the hardware board. The nonmaskable pseudo-interrupt informs the processor of a debug request even when all device interrupts in the interrupt processor are disabled. A processor-to-bus bridge connected to the processor on the hardware board contains a critical interrupt register. Test equipment connected to the processor-to-bus bridge sets a bit in the critical interrupt register for requesting the nonmaskable pseudo-interrupt, the processor-to-bus bridge reading the bit in the critical interrupt register to determine whether a nonmaskable pseudo interrupt debug request has occurred. The processor-to-bus bridge asserts the MCP input line of the processor after determining that the test equipment has requested the nonmaskable pseudo-interrupt. The processor then executes handler software that communicates with the test equipment to debug the hardware board.

15 Claims, 3 Drawing Sheets

NONMASKABLE INTERRUPT WORKAROUND FOR A SINGLE EXCEPTION INTERRUPT HANDLER PROCESSOR

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The present invention generally relates to the processing of interrupts within a computer system. More particularly, the present invention relates to the accommodation of multiple levels of interrupts for a single exception handler processor that is not inherently designed to accommodate multiple interrupt levels. More particularly still, the invention relates to an improved interrupt processing technique for use with a disk array controller that includes a single exception handler processor to permit the processor to respond to an interrupt generated during a debug operation although all interrupts have been disabled.

2. Background of the Invention

Computer systems include at least one, and often more than one, central processing unit ("CPU"), also referred to as a "processor." Processors typically include many input and output signals. Examples include data and address lines, clock lines, power and ground lines, and others. Most processors include at least one "interrupt" input signal. An interrupt is a signal generated by a device within the computer system, such as a keyboard, floppy disk drive controller or hard disk drive controller, when that device needs the processor to perform a task. For example, a modem might assert an interrupt when it detects an incoming transmission on the telephone line. Although there are other ways (besides the use of interrupts) for devices in a computer system to request an action, interrupt techniques have been widely used for many years and provide an efficient way to inform the system that an action is required.

The processor responds to an asserted interrupt by stopping execution of the code currently under execution and retrieving an "interrupt handler vector" which informs the processor of the location of the interrupt code to execute to service the interrupt. The interrupt code is usually referred to as an interrupt handler.

Many processors provide multiple "levels" of interrupts. Accordingly, one or more interrupt signals can be assigned to each level. Some levels may have a higher priority than other levels and thus may be acted upon quicker than the interrupts assigned to lower levels. Each level has programmable characteristics that are separately programmable from those of other levels. For example, one programmable characteristic of an interrupt level is the ability to enable and disable the interrupt signals assigned to that level. Disabling an interrupt means that the processor will not respond to an asserted interrupt signal. Enabling interrupts is the opposite action in which the processor is permitted to respond to an asserted interrupt signal. There are various reasons why interrupts may need to be disabled. For instance, it may be important not to interrupt an action currently being performed by the processor. This may occur when a processor writes a set of data to memory. Other devices in the system may subsequently need access to that data set. If the data write cycle is permitted to be interrupted, the complete data set may not be written to memory before a device interrupts the processor to request access to the data. The processor or other logic can avoid this type of problem by disabling interrupts during the write cycle and then re-enabling the interrupts after the data set is fully written to memory.

With multiple interrupt levels, a computer system can have some interrupts disabled while other interrupts continue to be enabled and available for use. Although many processors have the provision for multiple interrupt levels, not all processors are so equipped. Processors that do not provide multiple interrupt levels have only a single interrupt level and are referred to as "single exception interrupt handler" processors. An example of such a processor is the PowerPC 600 and 700 series processors provided by IBM. In such a processor all of the interrupts are either enabled or disabled—it is not possible to enable only some of the interrupts. This inability to selectively disable certain interrupts can cause a problem when an interrupt is needed but none are enabled. The following example illustrates such a problem.

A Redundant Array of Independent Disks ("RAID") storage system typically includes multiple data drives on which data is stored and a parity drive in which parity data is stored. The parity data permits the contents of any one data drive to be calculated in the event that drive becomes non-operational. Such a RAID system is generally known to those of ordinary skill in the art. The system includes a controller board that provides an interface between the computer system and one or more mass storage devices typical of a RAID storage system. The controller board that the system uses to control the various drives includes a single exception interrupt handler processor in which all of the interrupts must be jointly either enabled or disabled. The controller board also includes a serial port through which a communication device, such as a laptop computer, can be connected to debug any problems experienced by the electronics on the board. After or upon connecting the laptop to the controller board, an interrupt is asserted to the controller board's processor to notify the board that the laptop has been connected and debugging operations are to begin.

If a person connects the laptop to the controller board at a time when the interrupts are disabled, the desired debugging activity will not be permitted to begin. The interrupts may be disabled at a time when a critical action is being performed by the board's electronics and when a device on the board malfunctions precluding the action from completing. In this instance, the interrupts are disabled when the board is experiencing a problem, but debugging cannot begin to diagnose the problem because the interrupts are disabled. Accordingly, a solution is needed for such a problem.

BRIEF SUMMARY OF THE INVENTION

The problems noted above are solved in large part by a single level interrupt processor on the array controller board that contains a critical failure input line that permits implementation of a nonmaskable pseudo-interrupt for debugging of the array controller. The nonmaskable pseudo-interrupt informs the processor of a debug request even when all device interrupts in the processor are disabled and the array controller board is inoperative. A processor-to-bus bridge connected to the single level interrupt processor on the array controller board contains an interrupt status register, interrupt mask register, and a critical interrupt register. Test equipment is connected to the processor-to-bus bridge through a three pin serial port, the test equipment able to set a bit in the critical interrupt register for requesting the nonmaskable pseudo-interrupt, the processor-to-bus bridge reading the bit in the critical interrupt register to determine whether a nonmaskable pseudo-interrupt has occurred. The processor-to-bus bridge asserts the critical failure input line of the processor after determining that the test equipment has requested the nonmaskable pseudo-interrupt. The processor then executes handler software routines that communicate with the test equipment to debug the array controller board.

BRIEF DESCRIPTION OF THE DRAWINGS

For a detailed description of the preferred embodiments of the invention, reference will now be made to the accompanying drawings in which.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ", Also, the term "couple" or "couples" is intended to mean either an indirect or direct electrical connection. Thus, if a first device couples to a second device, that connection may be through a direct electrical connection, or through an indirect electrical connection via other devices and connections.

DETAILED DESCRIPTION OF THE PREFERRED EMBODIMENTS

Figure 1:
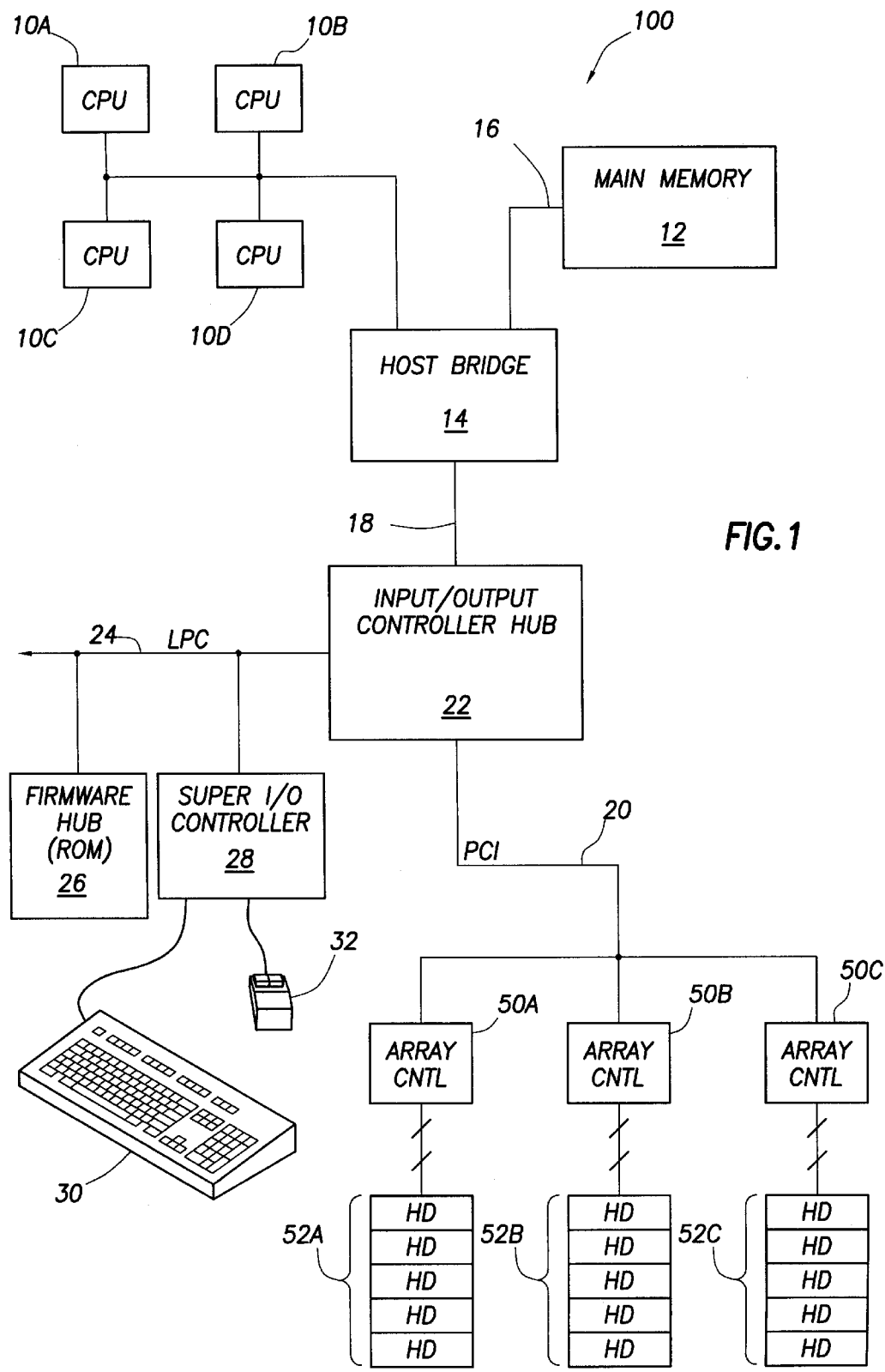
FIG. 1 shows a computer system constructed in accordance with the preferred embodiment of the invention including a plurality of disk array controllers.

Referring now to FIG. 1, computer system 100, constructed in accordance with the preferred embodiment, preferably comprises one or more central processing units ("CPUs") 10, main memory 12, host bridge 14, expansion bus 18, input/output controller hub 22, a firmware hub 26, a super I/O controller 28, one or more disk array controllers 50 and a plurality of disk drives 52. Inasmuch as computer system 100 is preferably a server system, the computer system 100 preferably comprises multiple CPUs 10A, 10B, 10C, 10D arranged as shown in a configuration to permit simultaneous, multi-tasking to occur. The CPUs may comprise, for example, Pentium® III processors from Intel Corp., or other suitable processors. It should be understood that the system 100 can include any number of CPUs and that computer system 100 may comprise a desktop or laptop machine, and may be used in a variety of configurations (e.g. server).

The CPU array 10 couples to a main memory array 12 and a variety of other peripheral computer system components through the integrated host bridge logic device 14. The main memory array 12 preferably couples to the host bridge logic 14 through a memory bus 16, and the host bridge logic 14 preferably includes a memory control unit (not shown) that controls transactions to the main memory 12 by asserting the necessary control signals during memory accesses. The main memory 12 functions as the working memory for the CPUs 10 and generally includes a conventional memory device or array of memory devices in which program instructions and data are stored. The main memory array 12 may comprise any suitable type of memory such as Dynamic Random Access Memory ("DRAM") or any of the various types of DRAM devices such as Synchronous DRAM ("SDRAM"), Extended Data Output DRAM ("EDO DRAM"), or Rambus™ DRAM ("RDRAM").

Inasmuch as computer system 100 is preferably a server system, the computer system 100 may not have a dedicated display device. If it is desired for the computer system to have a dedicated display device, such a system could be implemented by coupling a video driver card to the host bridge 14 by way of the expansion bus 18 or a separate bus (not shown). If it is desirable for the computer system to have a dedicated display device, a video driver or graphic controller would interface the display device to the system. The display may comprise any suitable electronic display device upon which any image or text can be represented.

In the preferred embodiment shown in FIG. 1, the primary expansion bus 18 comprises a Hub-link bus that is a proprietary bus of the Intel Corporation. However, computer system 100 is not limited to any particular type of primary expansion bus, and thus other suitable buses may be used. Moreover, the architecture shown in FIG. 1 is only exemplary of one suitable architecture, and any suitable architecture can be used.

In addition to the host bridge device 14, the computer system 100 also includes another bridge logic device 22 that bridges the primary expansion bus 18 to various secondary buses including a low pin count ("LPC") bus 24 and a peripheral component interconnect ("PCI") bus 20 (referred to as the "host" PCI bus). In accordance with the preferred embodiment, the bridge device 22 is the Input/Output Controller Hub ("ICH") manufactured by Intel Corp. and generally controls the flow of data to and from the device to which it connects. Although the ICH 22 of FIG. 1 is shown only to support the LPC bus 24 and the PCI bus 20, various other secondary buses may be supported by the ICH 22 instead of, or in addition to, LPC bus 24 and PCI bus 20.

Referring still to FIG. 1, the firmware hub 26 couples to the ICH 22 by way of the LPC bus 24. The firmware hub 26 preferably comprises a ROM device that contains code that is executable by the CPU array 10. This executable code preferably includes Basic Input/Output System ("BIOS") code that permits the computer to conduct the Power On Self Test ("POST") as well as to communicate with various I/O devices during normal system operations, as would be known by those of ordinary skill in the art.

The super input/output controller 28 also couples to the ICH 22 via LPC bus 24 and controls various system functions including interfacing with various input and output devices such as keyboard 30. The super I/O controller 28 may further interface, for example, with a system pointing device such as a mouse 32, various serial ports (not shown) and floppy drives (not shown).

The computer system 100 of FIG. 1 also includes three disk array controllers 50A, 50B, 50C coupled to the ICH 22 by way of the host PCI bus 20. Each disk array controller preferably is implemented as a separate expansion card, but can also be implemented on the server's main system board which also contain the CPU array 10, main memory 12, host bridge 14, ICH 22, firmware hub 24, and super I/O controller 28. Further, each disk array controller 50 couples to a plurality of hard drives 52A, 52B, 52C. Such a disk drive configuration is typical of the well-known Redundant Array of Independent Disk ("RAID") storage systems. RAID storage systems typically include multiple data drives on which data is stored and a "parity" drive in which parity data is stored. The parity data permits the contents of any one data drive to be calculated in the event one of the drives become non-operational. A RAID system thus is "fault tolerant" meaning that it can recover from a loss of one of its disk drives. RAID storage systems are generally known to those of ordinary skill in the art. It should be understood that while FIG. 1 shows three array controllers 50, computer system 100 may support any number of such controllers.

Figure 2:
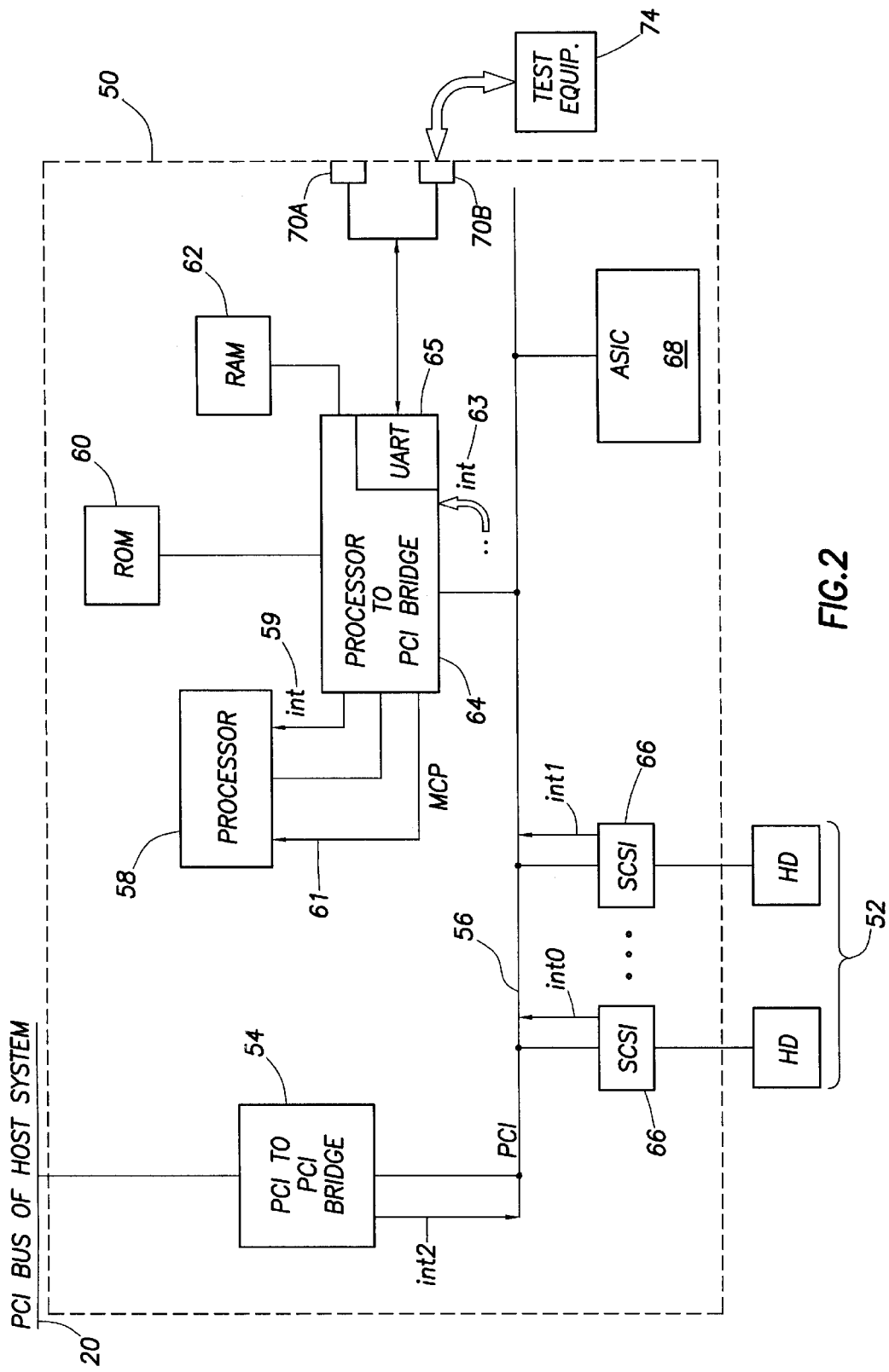
FIG. 2 shows a block diagram of one of the disk array controllers of FIG. 1.

FIG. 2 shows the preferred structure of a disk array controller 50 for use in the preferred embodiment of the invention. As shown, the disk array controller 50 preferably includes a PCI-to-PCI bridge 54, a disk array processor 58, a ROM device 60, Random Access Memory ("RAM") device 62, a processor-to-PCI bridge 64, one or more Small Computer System Interface ("SCSI") controllers 66, and an Application Specific Integrated Circuit ("ASIC") 68. Other devices may be included as desired.

The PCI-to-PCI bridge 54 couples the host PCI bus 20 to a PCI bus 56 that preferably is implemented on the disk array controller board 50. Because PCI bus 56 is local to the disk array controller 50, the bus is referred to as the disk array controller's "local" PCI bus. The local PCI bus 56 is used to couple together the PCI-to-PCI bridge 54, processor-to-PCI bridge 64, SCSI controllers 66, and ASIC 68. Each hard drive preferably couples to a dedicated SCSI controller 66. Although FIG. 2 only shows two hard drives 52 and two SCSI controllers 66, the array controller 50 can handle any desired number of hard drives 52. ASIC 68 is used to perform parity calculations in accordance with RAID and its functionality.

The processor 58 controls the operation of the disk array controller 50. The processor 58 may comprise a 700 Series PowerPC processor (e.g., model 740) manufactured by IBM Corp. However, other microprocessors or microcontrollers may be used as the array processor 58 and still be within the scope of this invention. The processor 58 can receive data from the host PCI bus via the PCI-to-PCI bridge 54 and write that data to the appropriate hard drive. The processor can also read data from the appropriate hard drive in response to a read request from the host PCI bus. In addition to writing data to and reading data from the disk drives 52, the array processor 58 preferably performs other functions specific to the functionality of the disk array controller 50 such as detecting and reporting errors associated with the operation of the disk array controller.

The processor 58 also couples to ROM 60 and RAM 62 via the processor-to-PCI bridge 64. The firmware instructions executed by the processor 58 are stored on ROM 60. During initialization of the disk array controller 50, the firmware is copied from ROM 60 to RAM 62 and executed from RAM 62.

Disk array controller 50 preferably also includes at least one and preferably two, test port connectors 70A and 70B. Both connectors preferably couple to a Universal Asynchronous Receiver Transmitter ("UART") 65 that is included as part of bridge 64. The UART 65 provides an asynchronous communication bridge between the processor 58 and test equipment 74 which may be connected to either connector 70A or 70B (shown connected to connector 70B in FIG. 2).

The test equipment 74 may comprise a laptop computer having software that permits the array controller 50 to be debugged. In conventional systems, connection of a test device to a port connector 70A or 70B automatically asserts an interrupt to processor 58. This interrupt will cause the system to enter a test mode to permit debugging to occur. If however, the interrupts have been disabled, connection of the test device will not work. As will be explained below, the preferred embodiment of the invention uses a machine check exception ("MCP") signal 61 to solve this problem. The MCP line normally functions as a critical failure signal to inform processor 58 of a catastrophic failure on the hardware board (e.g. chip is inoperable, interconnects between chips have been shorted together or are open so board is inoperative). The result is that a processor 58 that has no equivalent to a nonmaskable interrupt (NMI) (a NMI is an interrupt which cannot be disabled) capability is effectively given such a capability.

As shown in FIG. 2, various interrupts (int 0, int 1, int 2 . . . ) are generated by the devices given in FIG. 1 and FIG. 2 and are handled by processor 58. The interrupts are used by various devices on the array controller 50 to request service from processor 58. All of these interrupts are either channeled through the PCI bus 56 or through a separate set of sideband lines 63 to the processor-to-PCI bridge 64. The processor-to-PCI bridge 64 asserts the interrupt line int 59 to notify the processor 58 that one of the array controller's hardware devices has initiated an interrupt and must be serviced.

In addition to or instead of using MCP line 61 in accordance with its intended use (i.e. to notify processor 58 of a catastrophic failure on the hardware board), the processor-to-PCI bridge 64 uses the MCP line 61 as a nonmaskable, pseudo-interrupt. A pseudo-interrupt asserted on MCP line 61 to processor 58 at any time by test equipment 74 informs the processor of a critical failure requiring service independent of various device interrupts. After the MCP line is asserted, the processor calls an interrupt handler that executes software to service the machine check exception. Even if all device interrupts in the processor 58 are disabled, a pseudo-interrupt may be generated by asserting the MCP line using the communication software in the laptop connected through connectors 70A or 70B to the processor-to-PCI bridge 64. This nonmaskable pseudo-interrupt workaround permits debugging even if all interrupts in processor 58 have been disabled and a hardware failure has occurred on the array controller board 50 which has completely "hung" the system (i.e. the array controller board is inoperative and not responding) so that no onboard debug fault tolerance features can correct the problem. Thus, the unique function of the machine check exception MCP to detect a catastrophic hardware failure allows it to be used for debugging of the array controller board by test equipment.

In accordance with the preferred embodiment, the disk array controller is placed into a test mode upon connection of a test device to ports 70A or 70B. Preferably, the system uses the MCP input signal to the processor 58 to transition control to a test mode. The MCP signal is used because it is "independent" of the interrupt signals meaning that the MCP input to the processor is not disabled when the interrupts are disabled. As one of ordinary skill in the art should appreciate, any signal that is independent of the interrupt can be used; the MCP pin is an example of a suitable signal.

Figure 3:
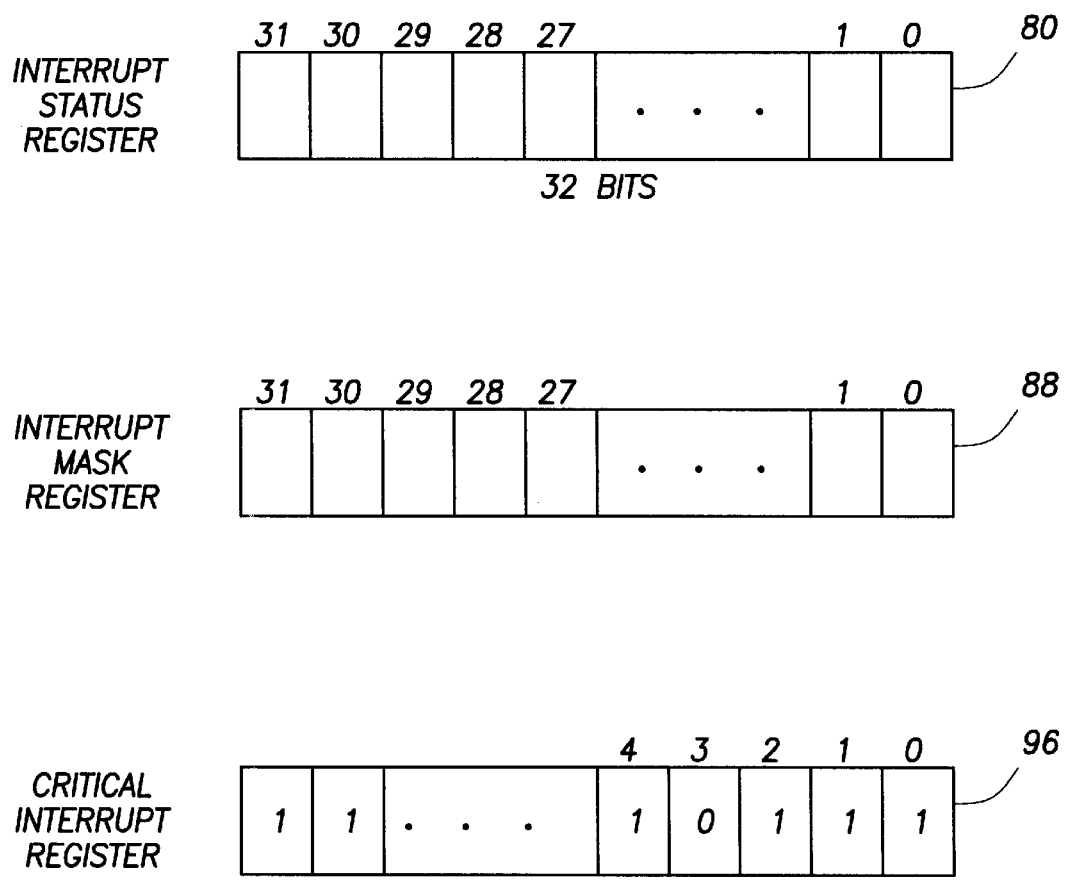
FIG. 3 shows various registers in the processor-to-PCI bridge that are used to implement the nonmaskable pseudo-interrupt workaround feature for the array controller board.

Referring now to FIG. 3, three registers 80, 88, and 96 included in processor-to-PCI bridge 64 are shown. Interrupt status register 80 contains a bit for each device interrupt defined for array controller board 50 and computer system 100 that is serviced by processor 58. The function of the interrupt status register is to inform the processor that an interrupt has occurred that requires service. Interrupt mask register 88 contains a mask bit for each interrupt in the interrupt status register that indicates whether the corresponding interrupt is disabled or enabled. The function of the interrupt mask register is to inform the processor whether the corresponding interrupt is spurious or for some other reason disabled and of no interest (e.g. the corresponding interrupt has not been implemented and lines are floating). Critical interrupt register 96 for the preferred embodiment contains a bit that communicates to the bridge that processor int line 59 or MCP line 61 should be asserted. Thus, the function of the critical interrupt register is to inform the processor whether a device interrupt or nonmaskable pseudo-interrupt has occurred.

All of the registers shown in FIG. 3 interact with the processor 58 in handling interrupts generated by the various devices shown in FIG. 1 and FIG. 2. The registers shown in FIG. 3 preferably are 32 bits in length but any size registers may be used. Bridge 64 reads critical interrupt register 96 to determine whether the processor int line 59 or MCP line 61 should be asserted. The critical interrupt register contains a bit that, set low, indicates that a MCP pseudo-interrupt debug request has been requested by the test equipment attached to connector 70B. Test equipment 74 communicates the debug request to UART 65 that then sets the critical interrupt register bit indicating that MCP line 61 should be asserted. In the preferred embodiment shown in FIG. 3, bit 3 functions to indicate a MCP pseudo-interrupt request but any bit in the critical interrupt register may be used. Processor-to-PCI bridge 64 preferably can recognize this interrupt as a MCP pseudo-interrupt and therefore asserts the MCP input pin to the processor 58. Any other bit set low in the critical interrupt register indicates that a system device hardware interrupt has occurred and the processor-to-PCI bridge asserts interrupt pin 59. If int 59 is asserted and interrupts are enabled in processor 58, the processor then reads the interrupt status register and the interrupt mask register to determine the appropriate machine interrupt. Otherwise, if the MCP pin is asserted, the processor executes the interrupt handler corresponding to the MCP pseudo-interrupt which preferably executes communication software to interact with the test equipment 74 for debugging of the array controller board 50. Therefore, even if interrupts are disabled in processor 58 and the board is hung, the system may still be debugged because of the independence of the MCP nonmaskable pseudo-interrupt from the hardware device interrupt.

Assertion of a general hardware device interrupt causes the corresponding bit to be set for that particular interrupt in the interrupt status register 80 in the processor-to-PCI bridge 64. Once a bit in the interrupt status register is set, the bridge 64 generates int 59 to the processor to indicate to the processor the occurrence of one or more hardware device interrupts. Thus, the processor-to-PCI bridge 64 by using the interrupt status register functions as an interrupt controller, coding many different interrupts from the various devices into the single interrupt line int 59 of processor 58. The processor then executes an interrupt handler routine that reads the registers shown in FIG. 3 in the processor-to-PCI bridge. The interrupt mask register 88 permits selective enabling and disabling of the interrupts from various devices by the processor-to-PCI bridge. Setting the appropriate bit in the interrupt mask register 88 disables the particular interrupt from that device or indicates that particular interrupt is not used in the system configuration. After an interrupt occurs, the interrupt handler performs a logical AND of the interrupt status register 80 and the interrupt mask register 88 to determine which device caused the interrupt. The logical AND results in one bit being set that indicates the particular device interrupt requested. The processor 58 then executes an interrupt handler service routine for the particular device interrupt.

Preferably the software running on the computer system connected to three-pin connector 70B are standard debugging tools developed by various software companies.

Various advantages and benefits may be gained by practicing the invention disclosed. The nonmaskable pseudo-interrupt workaround permits recovery and debug of faulty array controller boards independent of whether device interrupts are enabled or disabled. Overall system availability and reliability is increased because of the compartmentalized nature of the debug hardware and software that permits one array controller board to be debugged without effecting the remainder of computer system 100. Finally, for a single exception interrupt architecture processor such as the PowerPC 600 and 700 series, the present invention permits debugging of the controller board without increasing the cost or complexity of the hardware since preexisting registers and pins are used to implement the invention.

The above discussion is meant to be illustrative of the principles and various embodiments of the present invention. Numerous variations and modifications will become apparent to those skilled in the art once the above disclosure is fully appreciated. For example, the processor in the preferred embodiment is a PowerPC 600 or 700 series processor but any processor that has a single level interrupt architecture (i.e. all interrupts are either enabled or disabled) can benefit from aspects of the invention. Furthermore, the preferred embodiment uses a computer system connected to a three pin serial port connector for debugging of the array controller board but other debugging hardware built into the computer system 100 of FIG. 1 or attached externally through a bus can also be used to assert the MCP pin in the array controller board. The hardware buses of FIG. 1 and FIG. 2 are not limited to the bus as labeled and therefore the PCI bus 20 and 56 or LPC bus 24 may be a different bus and likewise the bridge devices connecting these buses can be generically labeled as "Processor-to-Bus Bridge" 64 or "Bus-to-Bus Bridge" 54. Finally, the present invention is not limited to debugging of a hardware board for control of RAID hard drive arrays as shown in FIG. 1 and FIG. 2 but may be any type of hardware board containing a single level interrupt handler processor. It is intended that the following claims be interpreted to embrace all such variations and modifications.

What is claimed is:

1. An array controller board for controlling a plurality of hard disk drives, said array controller board including a bridge logic device that couples together a processor, a memory, and a peripheral bus, comprising:

a critical failure signal input line to the processor asserted by a debug request from debugging computer coupled to the array controller board;

a hardware device interrupt input line to the processor asserted by said bridge logic device, said processor programmable to disable the device interrupt input line so hardware device interrupts are not detected by said processor; and a ROM coupled to the bridge logic device, said processor executing software stored on the ROM that services a debug request from said debugging computer asserted on said critical failure signal input line even when the processor has disabled the hardware device interrupt input.

2. The computer system of claim 1 wherein the bridge logic device includes an interrupt status register, interrupt mask register, and a critical interrupt register.

3. The computer system of claim 2 wherein the debugging computer executes debugging software that sets a bit in the critical interrupt register for requesting service by said processor, said bridge logic device reading said bit in the critical interrupt register to determine whether to assert said critical failure signal input line.

4. A computer system, comprising:

one or more system CPUs;

a keyboard coupled to said system CPUs; and a plurality of array controller boards coupled to said system CPUs, each of said array controllers interfacing with a set of hard disk drives, said array controllers each including a single level interrupt processor containing a critical failure signal input line asserted by a debug request from test equipment coupled to the processor to permit debugging of the array controller.

5. The computer system of claim 4 wherein assertion of the critical failure signal input line informs the processor of the debug request even when all device interrupts in the processor are disabled.

6. The computer system of claim 4 wherein the array controller further comprises a processor-to-bus bridge coupled to the single level interrupt processor, said processor-to-bus bridge including an interrupt status register, interrupt mask register, and a critical interrupt register.

7. The computer system of claim 6 wherein the test equipment sets a bit in the critical interrupt register for requesting said debug request, said processor-to-bus bridge reading said bit in the critical interrupt register to determine whether said debug request has occurred.

8. The computer system of claim 7 wherein the processor-to-bus bridge asserts a machine check exception (MCP) input line of said interrupt processor after determining that the debugging computer has requested said debug request.

9. A method of performing a nonmaskable interrupt in a computer system that includes a processor that does not have a nonmaskable interrupt input signal, comprising:

setting a bit in a critical interrupt register;

asserting a signal line of said processor that is independent of hardware device interrupts in response to setting of the bit in said critical interrupt register; and executing a software handler in response to the assertion of the signal line, wherein the software handler includes a communication module.

10. The method of claim 9, wherein the bit in the critical interrupt register is set by test equipment coupled to the processor, said bit being set indicating to the processor that the test equipment requests a nonmaskable interrupt.

11. The method of claim 9, wherein the communication module configures the processor to communicate with test equipment through a dedicated port.

12. The method of claim 9, wherein the communication module is executed only if said critical interrupt register bit is set.

13. An array controller board that comprises:

means for servicing interrupts from devices on the array controller board;

means for asserting an interrupt line to said means for servicing, said means for asserting including a critical interrupt register, wherein said means for asserting asserts a critical failure signal line to the means for servicing when a bit in the critical interrupt register is set; and wherein after the critical failure signal line is asserted, said means for servicing enables communication with test equipment.

14. An array controller board, comprising:

a processor;

a plurality of hardware interrupts that collectively are enabled or disabled;

bridge logic coupled to the processor; and a connector to which test equipment external to the array controller board can be connected;

wherein, upon connecting the test equipment to the connector, a bit is set in the bridge logic and in response to the bit being set, a critical failure signal is asserted by the bridge to the processor to indicate that a debug event is to occur;

wherein the critical failure signal also is configured to be asserted upon an occurrence of a catastrophic failure on the array controller board.

15. The array controller board of claim 14 wherein the critical failure signal is asserted even if the plurality of hardware interrupts are all disabled.

* * * * *